(12) United States Patent
Hoshide

(10) Patent No.: US 11,827,350 B2
(45) Date of Patent: Nov. 28, 2023

(54) FLYING ROBOT

(71) Applicant: THK CO., LTD., Tokyo (JP)

(72) Inventor: Kaoru Hoshide, Tokyo (JP)

(73) Assignee: THK CO., LTD., Tokyo (JP)

( * ) Notice: Subject to any disclaimer, the term of this patent is extended or adjusted under 35 U.S.C. 154(b) by 560 days.

(21) Appl. No.: 16/978,929

(22) PCT Filed: Mar. 5, 2019

(86) PCT No.: PCT/JP2019/008640
§ 371 (c)(1),
(2) Date: Sep. 8, 2020

(87) PCT Pub. No.: WO2019/172256
PCT Pub. Date: Sep. 12, 2019

(65) Prior Publication Data
US 2021/0047035 A1    Feb. 18, 2021

(30) Foreign Application Priority Data
Mar. 9, 2018    (JP) ................................ 2018-042961

(51) Int. Cl.
*G05D 1/08* (2006.01)
*B64C 39/02* (2023.01)
(Continued)

(52) U.S. Cl.
CPC ............ *B64C 39/024* (2013.01); *B64C 27/08* (2013.01); *B64U 10/10* (2023.01); *B64U 30/20* (2023.01); *G05D 1/08* (2013.01)

(58) Field of Classification Search
CPC ...... B64C 25/001; B64C 27/00; B25J 9/1679; B25J 19/005; B60F 5/02; B64D 1/22;
(Continued)

(56) References Cited

U.S. PATENT DOCUMENTS

2002/0060267 A1* 5/2002 Yavnai .................. B62D 57/04
                                                          180/7.4
2016/0236346 A1* 8/2016 Lee ........................... B25J 9/10
(Continued)

FOREIGN PATENT DOCUMENTS

CN    105667779 A  *  6/2016
CN    105667779 A     6/2016
(Continued)

OTHER PUBLICATIONS

International Search Report dated Jun. 11, 2019, issued in counterpart International Application No. PCT/JP2019/008640, with English Translation. (4 pages).
(Continued)

*Primary Examiner* — Tye William Abell
(74) *Attorney, Agent, or Firm* — WHDA, LLP

(57) ABSTRACT

A flying robot executing predetermined work, the flying robot comprising: a body unit; and a propulsion portion comprising a plurality of propulsion units configured to cause propulsion to occur by driving rotor blades, the plurality of propulsion units being provided on the body unit; the flying robot further comprising: a contact support unit configured to contact a predetermined contact surface to be capable of supporting at least a part of the body unit; a sensor configured to detect an inclination of the body unit; and a control unit configured to, when the contact support unit contacts the predetermined contact surface, and the predetermined work is being performed, execute posture control to drive at least one of the plurality of propulsion units based on the inclination of the body unit detected by the sensor so that the inclination of the body unit is kept within a predetermined angle range.

3 Claims, 7 Drawing Sheets

(51) Int. Cl.
*B64C 27/08* (2023.01)
*B64U 10/10* (2023.01)
*B64U 30/20* (2023.01)

(58) Field of Classification Search
CPC .... B64U 10/13; B64U 50/34; B64U 2101/60; G05D 1/021; G05D 1/101; G05D 2201/0217
See application file for complete search history.

(56) References Cited

U.S. PATENT DOCUMENTS

| | | | |
|---|---|---|---|
| 2017/0210469 A1* | 7/2017 | Piasecki | B64C 27/22 |
| 2019/0202560 A1* | 7/2019 | Bosworth | B64D 1/00 |
| 2019/0314990 A1* | 10/2019 | Sugaki | B25J 9/162 |

FOREIGN PATENT DOCUMENTS

| | | |
|---|---|---|
| JP | 58-66679 A | 4/1983 |
| JP | 2002-200990 A | 7/2002 |
| JP | 2006-297554 A | 11/2006 |
| JP | 2016-34684 A | 3/2016 |
| JP | 2017-202561 A | 11/2017 |
| JP | 2018-15 A | 1/2018 |
| WO | 2016/193666 A2 | 12/2016 |

OTHER PUBLICATIONS

Notification of Reasons for Refusal dated Oct. 29, 2019, issued in counterpart of Japanese Patent Application No. 2018-042961, with English Translation. (6 pages).

Notification of Reasons for Refusal dated Feb. 4, 2020, issued in counterpart of Japanese Patent Application No. 2018-042961, with English Translation. (5 pages).

* cited by examiner

[Fig. 1]
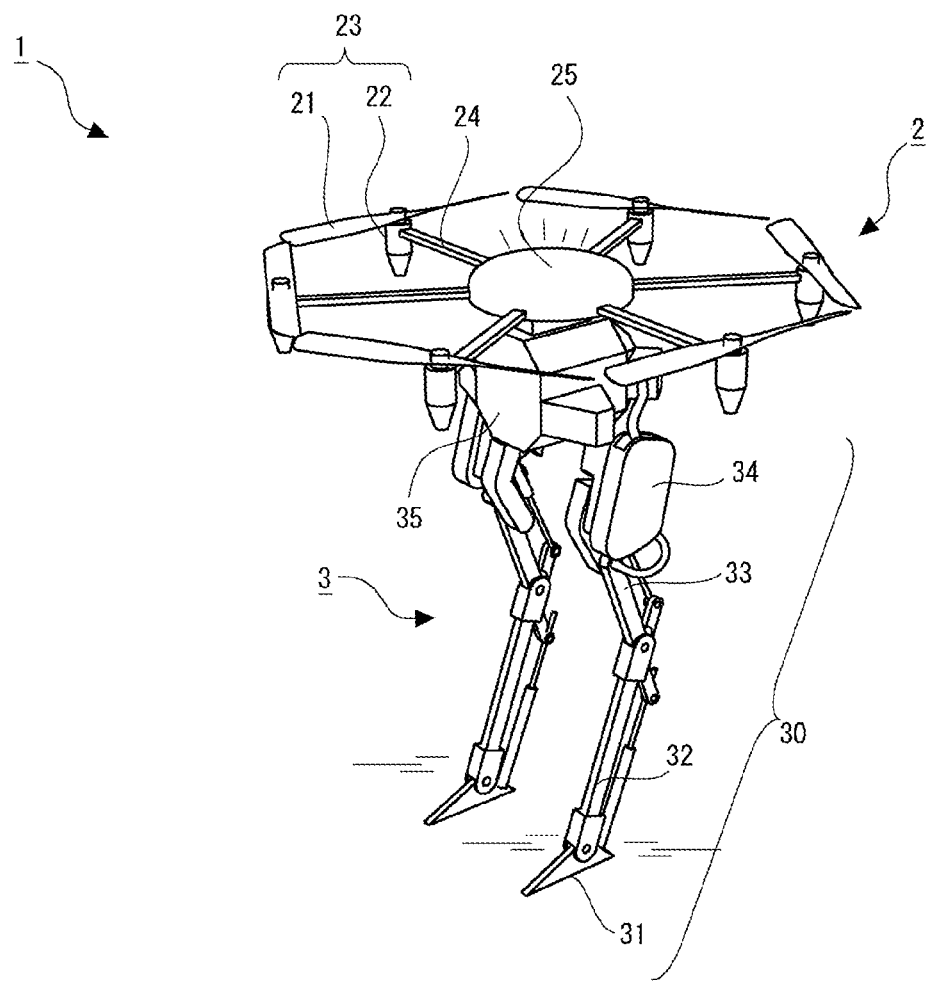

[Fig. 2]
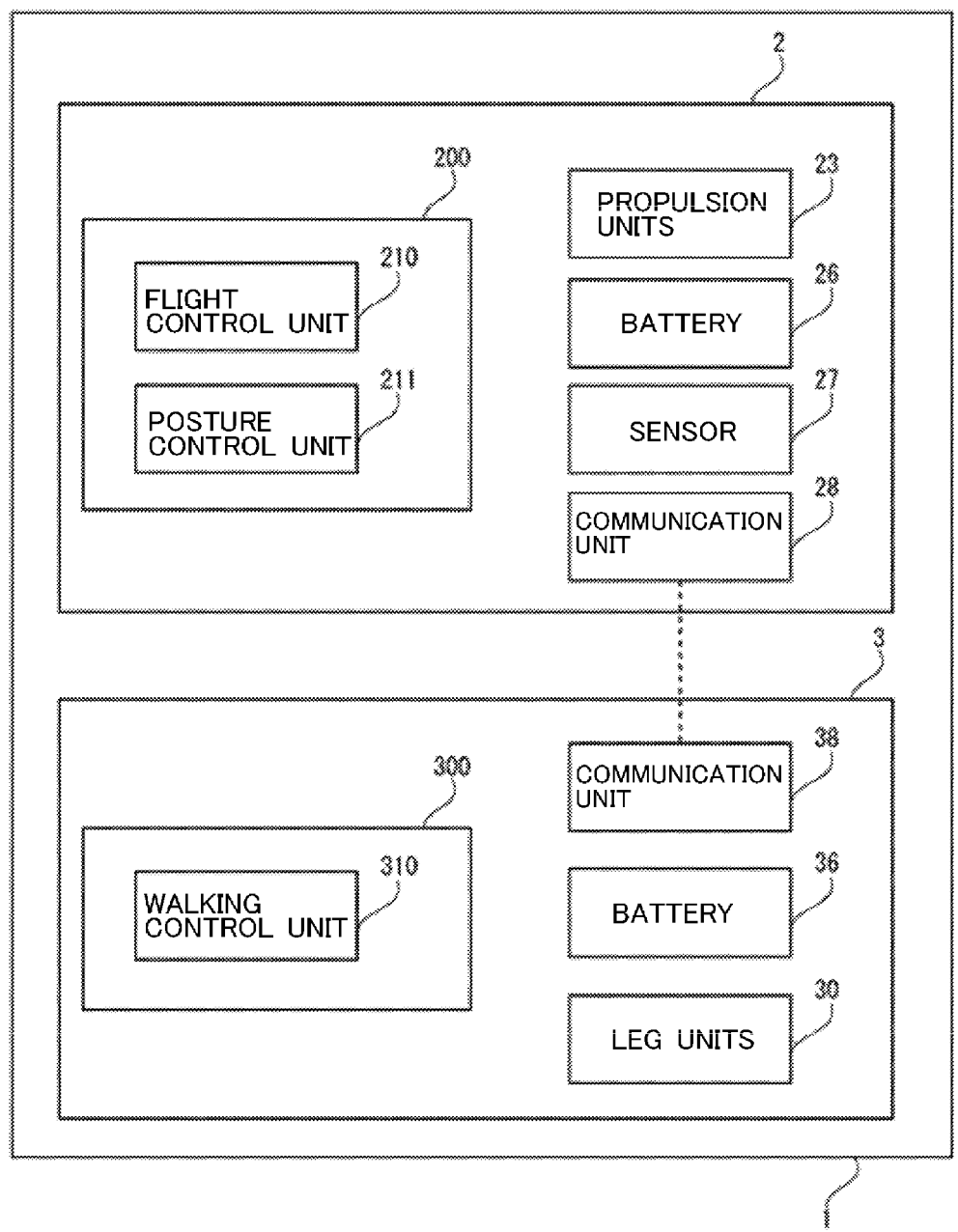

[Fig. 3]
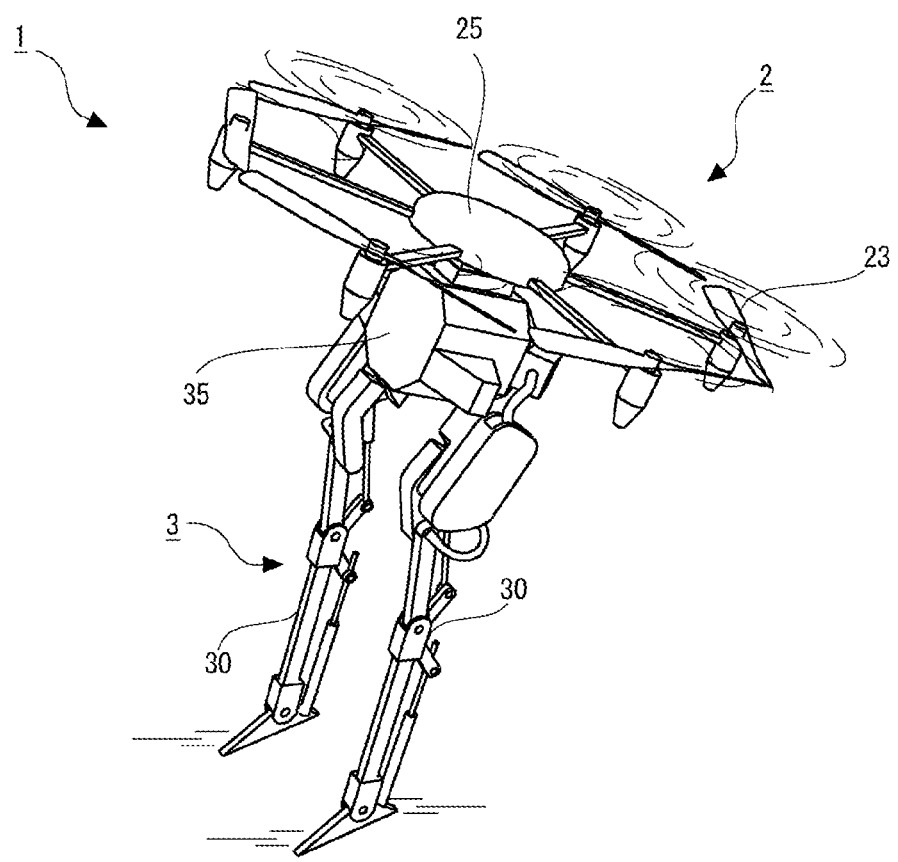

[Fig. 4]
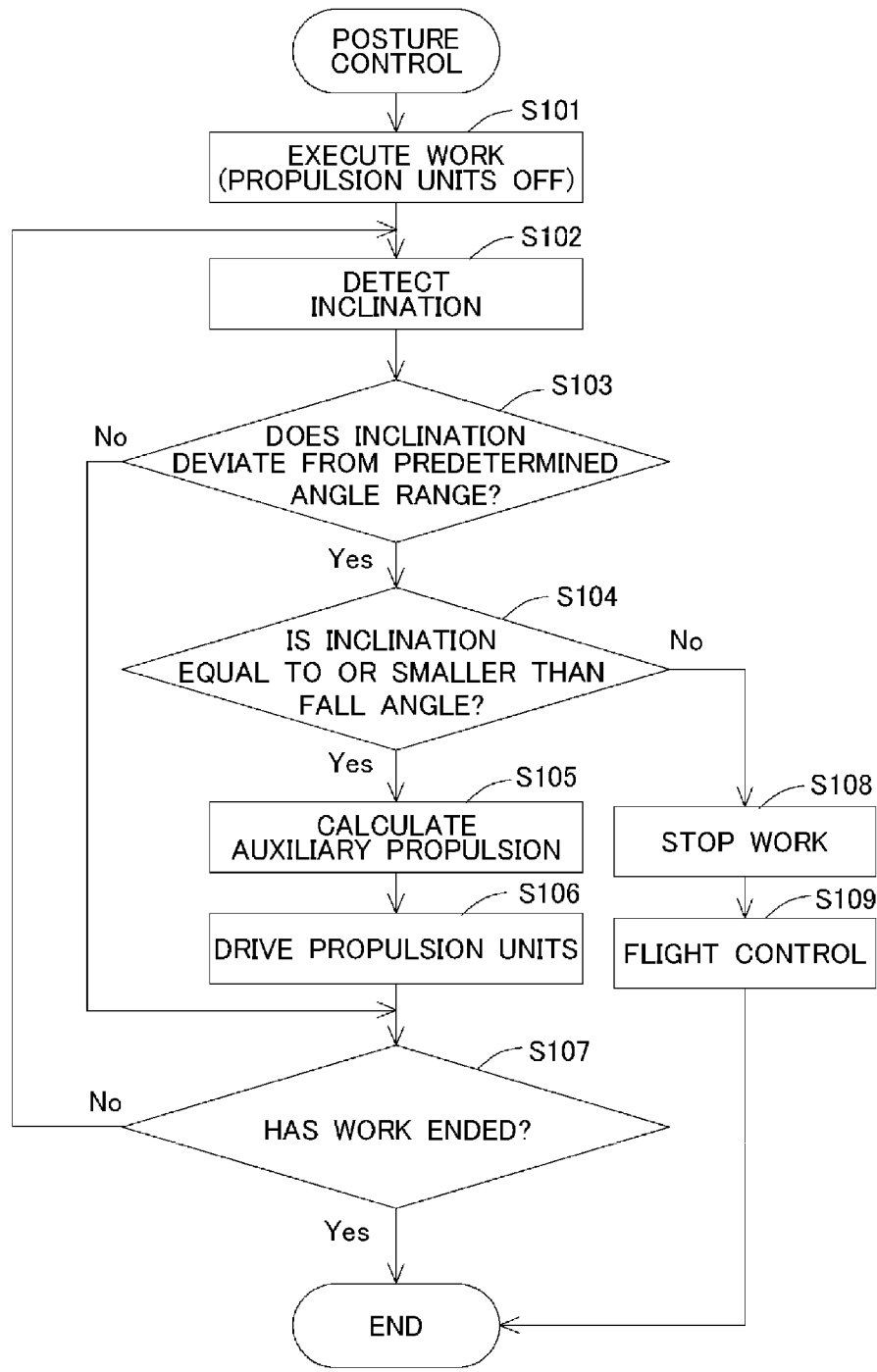

[Fig. 5A]
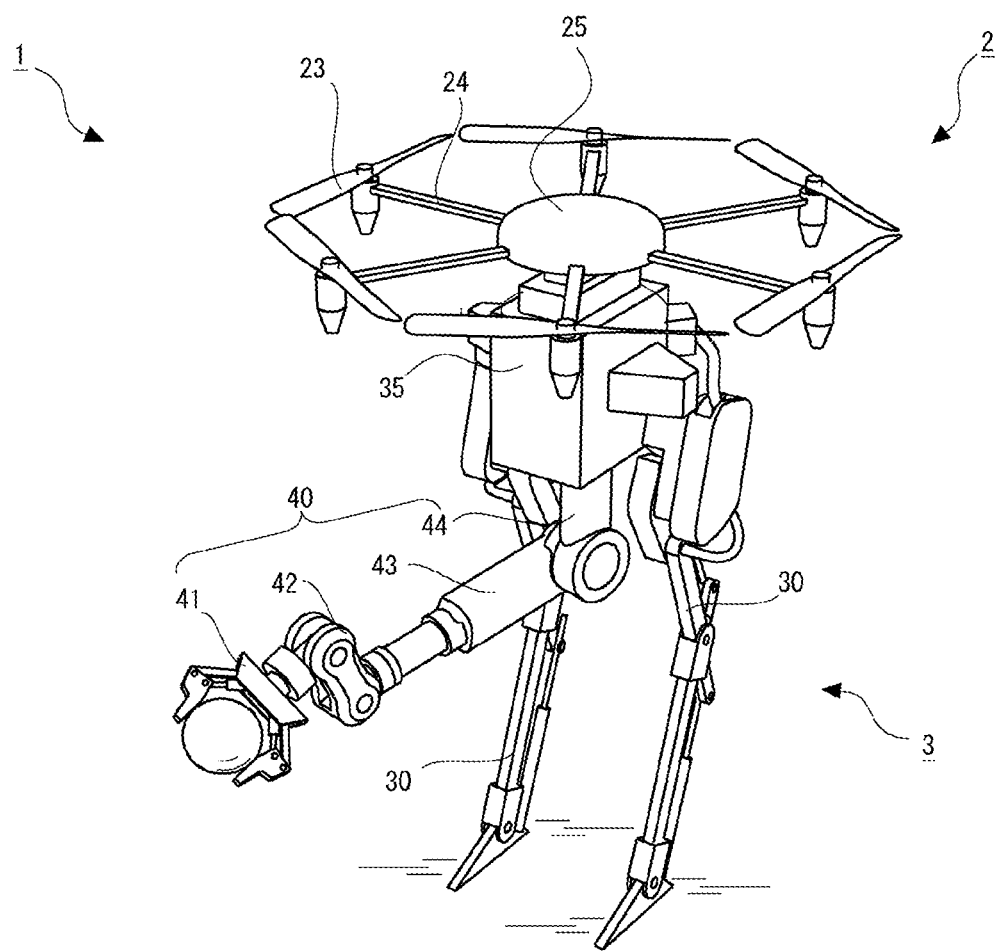

[Fig. 5B]
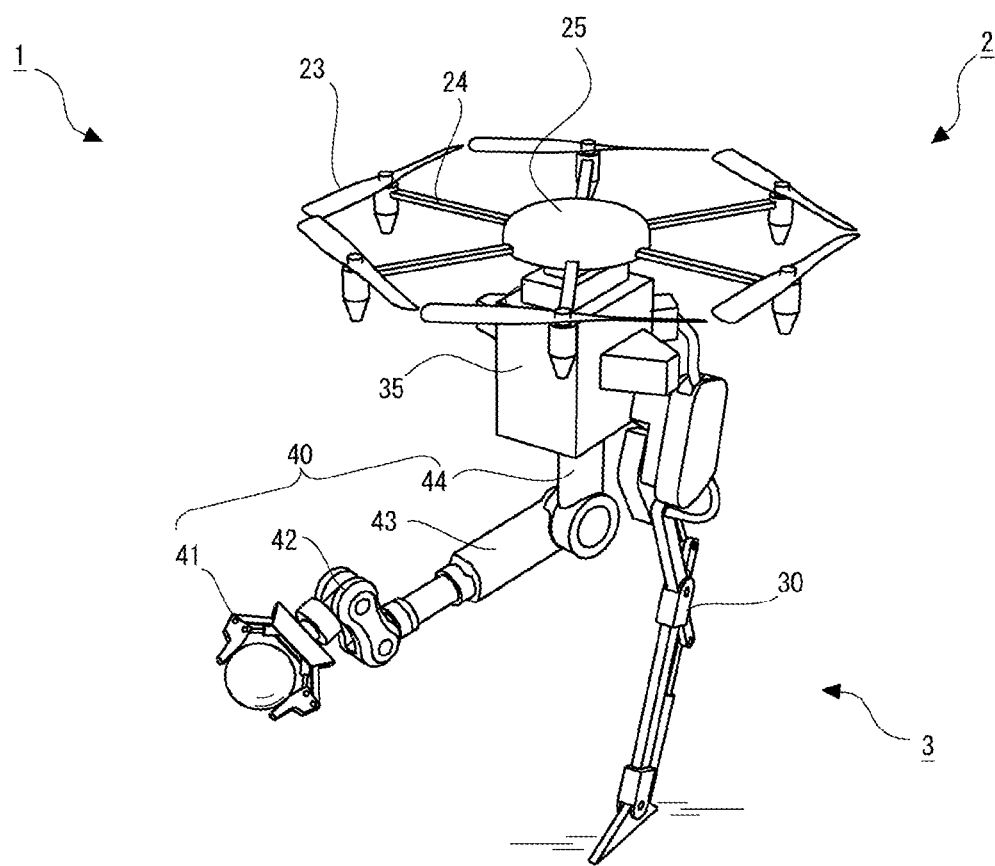

[Fig. 6]
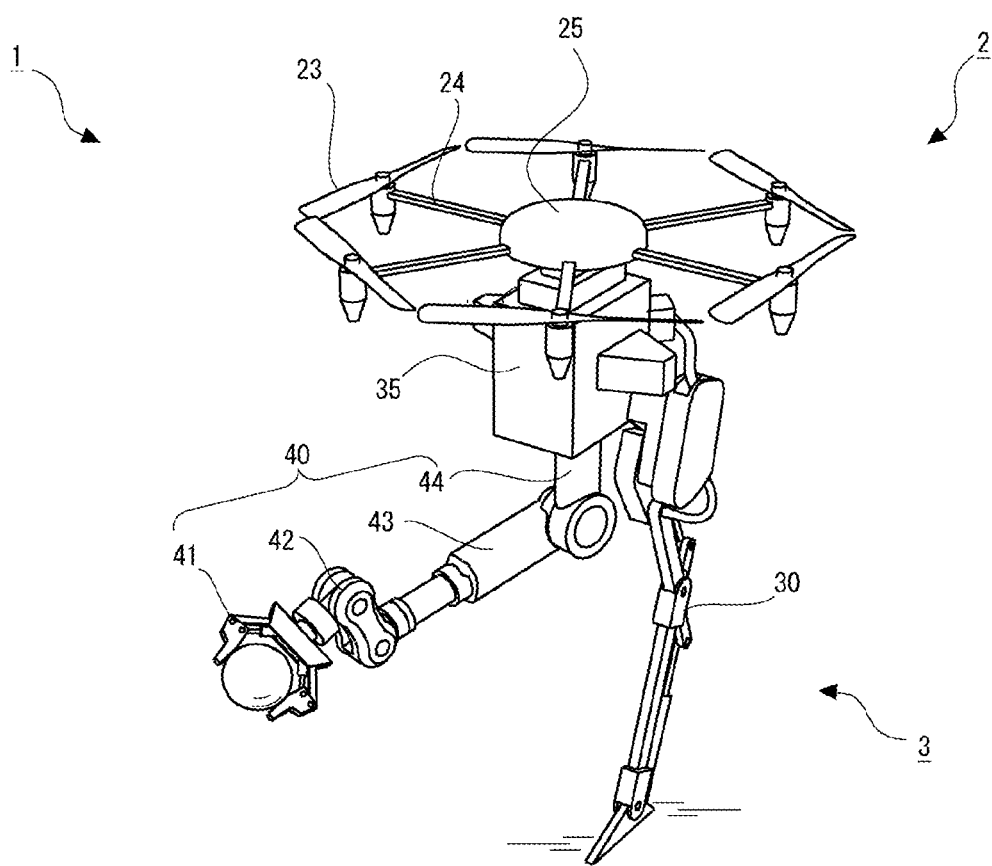

FLYING ROBOT

TECHNICAL FIELD

The present invention relates to a flying robot capable of flying and capable of executing predetermined work.

BACKGROUND ART

Recently, unmanned flying bodies have been used for various purposes, and development thereof has been actively performed. As unmanned flying bodies, a radio-controlled unmanned helicopter and a so-called drone are used. For example, as examples of utilizing a drone for agricultural purposes, spraying of pesticide, observation of growth of agricultural products using a mounted camera, generation of an air flow for protecting agricultural products from frost damage and the like can be given (see, for example, Patent document 1).

Further, development of a flyable robot is also performed by installing an arm or the like to execute predetermined work, on an unmanned flying body so the flyable robot can be widely used not only for the agricultural purposes but also for other purposes. For example, in a technique shown in Patent document 2, a plurality of arms provided on a robot body are provided with propellers that enable the robot to fly. Thereby, the robot can fly, move to an arbitrary place, walk on the ground using the plurality of arms and perform predetermined work. Further, Patent document 3 makes a disclosure to the effect that a flyable robot is configured by attaching very versatile robot hands to a multicopter.

CITATION LIST

Patent Document

[Patent Document 1]
  Japanese Patent Laid-Open No. 2018-000015
[Patent Document 2]
  International Publication No. WO 2016/193666
[Patent Document 3]
  Japanese Patent Laid-Open No. 2017-202561
[Patent Document 4]
  Japanese Patent Laid-Open No. 2002-200990

SUMMARY OF THE INVENTION

Problems to be Solved by the Invention

A main purpose of an unmanned flying body such as a drone is to fly. Therefore, the unmanned flying body itself cannot perform work, and, generally, manipulators such as arms and leg units for performing such work are attached to the unmanned flying body. Then, when the unmanned flying body performs such work, there is a possibility that, by receiving reaction force from a target of the work (for example, a target object that the manipulator contacts and causes predetermined force to work for the work) or receiving other external forces, the unmanned flying body is out of balance, and smooth work is hindered.

The present invention has been made in view of the above problem and relates to a flying robot, which is a flying body, configured to perform predetermined work, and an object is to provide a technique for realizing smooth work.

Means for Solving the Problems

In the present invention, in order to solve the above problem, a configuration is adopted in which a flying robot of the present invention is provided with a contact support unit configured to contact a contact surface at the time of executing predetermined work, and propulsion of propulsion units is controlled. By the configuration, it becomes easy to resist reaction force from a target of the work by the contact support unit, and it is possible to maintain balance of the flying robot to be in a state suitable for the predetermined work by using the propulsion of the propulsion units. Thereby, it is possible to realize smooth work by the flying robot.

In particular, the present invention is a flying robot executing predetermined work, the flying robot comprising: a body unit; and a propulsion portion comprising a plurality of propulsion units configured to cause propulsion to occur by driving rotor blades, the plurality of propulsion units being provided on the body unit; the flying robot further comprising: a contact support unit configured to contact a predetermined contact surface to be capable of supporting at least a part of the body unit; a sensor configured to detect an inclination of the body unit; and a control unit configured to, when the contact support unit contacts the predetermined contact surface, and the predetermined work is being performed, execute posture control to drive at least one of the plurality of propulsion units based on the inclination of the body unit detected by the sensor so that the inclination of the body unit is kept within a predetermined angle range.

Effects of the Invention

It is possible to cause a flying robot, which is a flying body, configured to perform predetermined work to realize smooth work.

BRIEF DESCRIPTION OF THE DRAWINGS

FIG. 1 is a view illustrating a schematic configuration of a flying robot according to an embodiment;

FIG. 2 is a functional block diagram in which functional units formed in the flying robot according to the embodiment are imaged;

FIG. 3 is a view illustrating a form when the flying robot illustrated in FIG. 1 walks;

FIG. 4 is a flowchart about posture control executed in the flying robot according to the embodiment;

FIG. 5 is a first modification of the flying robot according to the embodiment; and FIG. 6 is a second modification of the flying robot according to the embodiment.

MODE FOR CARRYING OUT THE INVENTION

For a flying robot of the present embodiment, propulsion for flight is generated by a plurality of propulsion units provided on a body unit side. Each of the propulsion units has a rotor blade, and propulsion of the propulsion unit is decided by the rotor blade being driven to rotate. Preferably, the propulsion of each propulsion unit can be independently controlled. Arrangement of the plurality of propulsion units on the body unit can be arbitrarily designed. By balance among the propulsions of propulsion units provided on the body unit, flight states (rise, descent, turn and the like) of the flying robot are controlled. All the plurality of propulsion units provided on the body unit may be of the same type, or different types of propulsion units may be mixed together.

The flying robot is configured to be capable of executing predetermined work. The predetermined work executed by the flying robot of the present embodiment is not limited to work with particular content. For example, the flying robot may be provided with an end effector or arm units to grasp a target object as the predetermined work. Alternatively, the flying robot may be provided with leg units to ground and walk on the ground as the predetermined work. In the former example, the flying robot receives reaction force against grasping force from the grasped target object. In the latter example, the flying robot receives reaction force from the ground on which the flying robot walks. As described above, at least in execution of predetermined work, the flying robot is in a state of being worked on by some force from a target of the predetermined work. Further, the flying robot can also receive external force from something other than a target object (for example, a wind). Note that, when the flying robot is performing predetermined work, propulsion may be generated by the propulsion units, and the flying robot may be flying. Alternatively, the flying robot may be in a state of not flying. In any of the cases, the flying robot is in a state of being worked on by some force from outside while executing the predetermined work.

Here, the flying robot is provided with a contact support unit capable of supporting at least a part of the body unit, and the contact support unit is in contact with a predetermined contact surface so as to support a part or all of the body unit when the flying robot executes predetermined work. Such a configuration makes it possible for the flying robot to, even when the flying robot receives force from outside while executing predetermined work, resist the external force via the contact support unit, and it is useful to maintain the posture of the flying robot. Note that the contact support unit only has to be configured to support at least a part of the body unit of the flying robot. The contact support unit may be such as is configured exclusively for the support. Alternatively, a part or all of structures to perform predetermined work (for example, the arm units or the leg units described above) may function as the contact support unit.

Note that, even when the flying robot is provided with the contact support unit as described above, there may be a case where it becomes difficult to maintain the posture of the flying robot to be in a sufficiently preferable state, depending on a magnitude and the like of force that the flying robot receives from outside. Therefore, in the flying robot of the present embodiment, posture control by a control unit is performed. In this posture control, an inclination of the body unit of the flying robot detected by the sensor is kept within a predetermined angle range by driving at least one of the plurality of propulsion units. As a result, even when the posture of the flying robot is significantly out of balance while executing predetermined work, it is possible to cause the posture to be restored to a state suitable for execution of the predetermined work, that is, a state in which the inclination is kept within the predetermined angle range by propulsion obtained by auxiliary driving the propulsion units. Thereby, the predetermined work that is smooth is realized.

Note that the predetermined angle range can be appropriately set according to content of predetermined work. In other words, if the content of predetermined work differs, a corresponding predetermined angle range may also differ. As for the sensor of the flying robot, the sensor may be such as directly detects the inclination of the body unit or may be a sensor that detects a parameter that relates to the inclination and is capable of calculating the inclination. For example, an acceleration sensor, a gyro sensor and the like can be given.

A specific embodiment of the present invention will be described below based on drawings. Sizes, materials, shapes, relative arrangement and the like of component parts described in the present embodiment are not intended to limit the technical scope of the invention only thereto unless otherwise stated.

Embodiment

Here, a flying robot 1 according to the present embodiment will be described based on FIG. 1. A body unit of the flying robot 1 is formed, including an upper-side body unit 2 mainly related to flight ability of the flying robot 1 and a lower-side body unit 3 mainly related to predetermined work by the flying robot 1. In other words, in the present embodiment, the body unit of the flying robot 1 is integrally formed with the upper-side body unit 2 and the lower-side body unit 3.

First, the upper-side body unit 2 will be described. The upper-side body unit 2 has a plurality of propulsion units 23. Note that, though six propulsion units 23 are mounted on the upper-side body unit 2 in the example illustrated in FIG. 1, the number of mounted propulsion units 23 only has to be two or more and is not limited to six as far as flight of the flying robot 1 is possible. Each propulsion unit 23 has a propeller 21, which is a rotor blade, and an actuator 22 for driving the propeller 21 to rotate. Though all the propulsion units 23 mounted on the upper-side body unit 2 are units of the same type, the actuator 22 can be independently controlled in each propulsion unit 23. Therefore, it is possible to appropriately control propulsion obtained by each propulsion unit 23, and, thereby, it becomes possible to appropriately control a flight posture, a flight speed and the like of the flying robot 1. Note that flight control of the flying robot 1 by the propulsion units 23 will be described later.

Here, the upper-side body unit 2 has an upper-side body 25 almost in the center thereof, and the propulsion units 23 are provided via bridges 24 radially extended from the upper-side body 25, on a tip side of the bridges 24. The six propulsion units 23 are arranged at regular intervals on a circumference, with the upper-side body 25 as the center. Further, the upper-side body 25 is mounted with a battery 26 (see FIG. 2) for supplying drive power to the actuator 22 of each propulsion unit 23, and a control device 200 (see FIG. 3) that controls power supply from the battery 26 to the actuators 22 and the like. Details of control about the upper-side body unit 2 by the control device 200 will be described later.

Next, the lower-side body unit 3 will be described. The lower-side body unit 3 has two leg units 30 configured to be capable of executing walking work as predetermined work by the flying robot 1. Note that, though two leg units 30 are provided on the lower-side body unit 3 in the example illustrated in FIG. 1, the number of leg units 30 is not limited to two, and three or more leg units 30 may be provided as far as the walking work as the predetermined work is possible. If grasping work of grasping a target object is assumed as predetermined work, an arm unit 40 can be configured as illustrated in FIGS. 5A and 5B described later. Components illustrated in FIG. 5A and the like will be described later.

Each leg unit 30 has a grounding unit 31 that grounds when the flying robot 1 walks by walking work, a first link unit 32 that is relatively rotatably connected with the grounding unit 31 via a joint, a second link unit 33 that is relatively rotatably connected with the first link unit 32 via a joint, a hip joint unit 34 that is relatively rotatably connected with the second link unit 33 via a joint, and a plurality of actuators (not illustrated) that drive-control rotation of the joints. A rotation direction of each of these joints is designed according to assumed walking work. As an example, the joint between the grounding unit 31 and the first link unit 32 is configured to be capable of rotating around a roll axis and a pitch axis; and the joint between the first link unit 32 and the second link unit 33 and the joint between the second link unit 33 and the hip joint unit 34 are configured to be capable of rotating around the pitch axis. Note that the configuration of each joint is not limited to such an aspect.

The hip joint unit 34 is relatively rotatably connected with a lower-side body 35 that the lower-side body unit 3 has, via a predetermined joint. This predetermined joint is configured to be capable of rotating around a yaw axis. The predetermined joint may also be configured to be capable of rotating around the roll axis and the pitch axis. As for the leg units 30 connected with the lower-side body 35, walking work as predetermined work is realized by actuators for driving the joints, which are provided inside the two leg units 30, respectively, being controlled in linkage with each other. Further, when work other than the walking work is assumed for the leg units 30, for example, when contacting a target object or causing external force to work on a target object by one leg unit 30 while supporting the flying robot 1 by the other leg unit 30, the two leg units 30 may be controlled in linkage with each other, or each of the leg units 30 may be independently controlled.

Further, the lower-side body 35 is mounted with a battery 36 (see FIG. 2) for supplying drive power to the actuator of each leg unit 30, and a control device 300 (see FIG. 3) that supplies power from the battery 36 to the actuators and controls work by the leg units 30. Details of control about the lower-side body unit 3 by the control device 300 will be described later.

The leg units 30 configured as described above are structures enabling walking work of the flying robot 1 as described above and can be said to be structures for supporting the self-weight of the flying robot 1, especially the self-weight of its body unit when the walking work is being performed, and resisting reaction force that the flying robot 1 receives from a walking surface. Therefore, the leg units 30 realize walking work and function as the contact support unit of the present invention.

<Control Unit of Flying Robot 1>

Next, a controllable configuration of the body unit that the flying robot 1 has, that is, the upper-side body unit 2 and the lower-side body unit 3 will be described based on FIG. 2. FIG. 2 is a block diagram illustrating each functional unit included in each of the upper-side body unit 2 and the lower-side body unit 3. The upper-side body unit 2 has the control device 200 to perform flight control and the like about flight. The control device 200 is a computer having a processor and a memory, and has a flight control unit 210 and a posture control unit 211 as functional units. Each functional unit is formed by a predetermined control program being executed in the control device 200.

The flight control unit 210 is a functional unit that, when the flying robot 1 flies, controls the propulsion units 23 to generate propulsion for the flight. The flight control unit 210 controls the propulsion of the six propulsion units 23 based on environmental information that is information related to a flight state of the flying robot 1 and is detected by a sensor 27. As the environmental information, information about an angular speed of the upper-side body unit 2 detected by a gyro sensor corresponding to the three axes not illustrated (the yaw axis, the pitch axis and the roll axis) and an inclination of the upper-side body unit 2 detected by an acceleration sensor corresponding to the above three axes not illustrated can be given as an example. Using the environmental information acquired from these sensors, the flight control unit 210 feedback-controls the inclination of the upper-side body unit 2, which can be identified with an inclination of the body unit of the flying robot 1, to be in a state suitable for flight of the flying robot 1. Furthermore, the environmental information may include an azimuth, which is an orientation of the upper-side body unit 2 (that is, an orientation of the body unit of the flying robot 1) in an absolute coordinate system when an orientation of the earth's axis is used as a reference, and the azimuth can be detected by an azimuth sensor.

Here, in the case of causing the body unit of the flying robot 1 to move forward, backward, left or right, the flight control unit 210 decreases the number of rotations of actuators 22 of propulsion units 23 in a travel direction and increases the number of rotations of actuators 22 of propulsion units 23 on a side opposite to the travel direction, and, thereby, the body unit of the flying robot 1 is in a posture of leaning forward relative to the travel direction and travels in a desired direction. Further, in the case of causing the body unit of the flying robot 1 to rotationally move, the flight control unit 210 performs output in a rotation direction of the propellers 21 based on a rotation direction of the body unit of the flying robot 1. For example, in the case of causing the body unit of the flying robot 1 to rotate right, the flight control unit 210 decreases output of actuators 22 corresponding to propellers 21 rotating right and increases output of actuators 22 corresponding to propellers 21 rotating left.

The posture control unit 211 is a functional unit that executes posture control to maintain the posture of the flying robot 1 when the flying robot 1 is performing walking work, which is predetermined work, by a walking control unit 310 on the lower-side body unit 3 side described later to be in a state suitable for the walking work. The posture control will be described later based on FIG. 4.

Next, functional units on the lower-side body unit 3 side will be described. The lower-side body unit 3 has the control device 300 to perform control about walking work by the leg units 30 as predetermined work.

The control device 300 is a computer having a processor and a memory, and has the walking control unit 310 as functional units. The walking control unit 310 is formed by a predetermined control program being executed in the control device 300.

The walking control unit 310 is a functional unit that controls the actuators provided for the two leg units 30 for walking of the flying robot 1 when the flying robot 1 walks. The walking control unit 310 controls the leg units 30 based on environmental information related to a walking state of the lower-side body unit 3 and the like. As the environmental information, information about an angular speed of the lower-side body unit 3 detected by a gyro sensor corresponding to the three axes not illustrated (the yaw axis, the pitch axis and the roll axis), an inclination of the lower-side body unit 3 detected by an acceleration sensor corresponding to the above three axes not illustrated and the like can be given as an example. The actuator provided for each joint of the leg units 30 is provided with an encoder (not illustrated) that detects a quantity of state about a rotational state of the actuator (a rotational position, a rotational speed and the like of the rotation axis of the actuator). Based on the quantity of state of each actuator detected by the encoder of the actuator, the walking control unit 310 feedback-controls the actuators of the leg units 30 so that the inclination and the like of the lower-side body unit 3 are in states suitable for walking.

Next, the body unit of the flying robot 1 is formed by the upper-side body unit 2 and the lower-side body unit 3. As described above, the upper-side body unit 2 has the control device 200 that is mainly responsible for control about flight of the flying robot 1, and the lower-side body unit 3 has the control device 300 that is mainly responsible for control about walking work by the flying robot 1. In order to enable giving and receiving of signals between both control devices, a communication unit 28 is formed in the upper-side body unit 2, a communication unit 38 is formed in the lower-side body unit 3, and a configuration is made in which wired communication is enabled between the communication unit 28 and the communication unit 38. By this configuration, when cooperation control such as linkage of operations is required between the upper-side body unit 2 and the lower-side body unit 3, it becomes possible to give and receive signals for the cooperation control between the control device 200 and the control device 300.

<Posture Control>

Here, a problem that occurs when the flying robot 1 is performing walking work by the walking control unit 310 will be considered. When the flying robot 1 performs walking work as predetermined work, the grounding unit 31 receives reaction force from a walking surface such as the ground. Especially, reaction force one leg unit 30 receives at a moment when the one leg unit 30 grounds in a state in which the other leg unit 30 has grounded can significantly influence the posture of the flying robot 1. Since the other leg unit 30 is in the state of having grounded, the flying robot 1 can resist the reaction force by the grounded leg unit 30 at a moment when the reaction force is applied. In some cases, however, the posture of the flying robot 1 is significantly out of balance, and it becomes difficult to continue the walking work (See, for example, a state of the flying robot 1 illustrated in FIG. 3. In the example of FIG. 3, a state in which the posture of the flying robot 1 is out of balance toward its back side is illustrated). In another example, even when the flying robot 1 is preferably performing walking work, resisting the above reaction force, the posture may be out of balance due to external force other than the reaction force from the walking surface (for example, force received from a wind hitting the flying robot 1, or the like).

When the posture of the flying robot 1 is significantly out of balance during the walking work as described above, it becomes difficult to continue the walking work, and it is not desirable. Therefore, when the posture of the flying robot 1 is out of balance as described above to the extent that the walking work becomes difficult, posture control for restoring the posture is performed. Therefore, the posture control of the flying robot 1 will be described based on FIG. 4. The posture control is realized mainly by a predetermined control program being executed in the control device 200 while the upper-side body unit 2 and the lower-side body unit 3 are in linkage with each other.

First, at S101, walking work, which is predetermined work, is executed by the flying robot 1. This walking work itself is executed by the walking control unit 310. Further, when the walking work is performed, driving of the propulsion units 23 is basically off (stopped). In other words, the walking work of the flying robot 1 is basically realized by the two leg units 30. In the walking work, for example, the flying robot 1 can enter a place where it is difficult to fly and can perform collection of target information and the like using a sensor, a camera and the like not illustrated in such a place. When the process of S101 ends, the flow proceeds to S102.

Next, at S102, an inclination of the body unit of the flying robot 1 is detected by a gyro sensor and an acceleration sensor included in the sensor 27. As illustrated in FIG. 1, since the flying robot 1 has the upper-side body unit 2 on the upper side, the center of gravity of the flying robot 1 is relatively high, and it is thought that the posture of the upper-side body unit 2 significantly influences in the walking work. Therefore, in the present embodiment, the posture of the upper-side body unit 2 is identified with the posture of the body unit of the flying robot 1, and an inclination of the upper-side body unit 2 detected by the sensor 27 is treated as the inclination of the body unit of the flying robot 1. The "inclination" in the present embodiment indicates an inclination of each of the yaw axis, the pitch axis and the roll axis of the flying robot 1. However, to simplify description of the specification, it is referred to merely as an "inclination" without specifying an axis unless it is necessary to especially refer to each axis. When the process of S102 ends, the flow proceeds to S103.

At S103, it is judged whether or not the inclination detected at S102 deviates from a predetermined angle range. Since the judgment is performed from a viewpoint of stability of the walking work of the flying robot 1, the predetermined angle range is set so that the walking work can be stably executed. Therefore, if a positive judgment is made at S103, it means that the inclination of the flying robot 1 is in such a state that it is difficult to stably perform the walking work. On the other hand, if a negative judgment is made, it indicates an opposite meaning. Since the pitch axis and the roll axis are set for the flying robot 1 as described above, the predetermined angle range is also set for each of the axes. If an inclination relative to any one of the two axes deviates from a corresponding predetermined angle range, the positive judgment may be made in the judgment process of S103. Alternatively, it may be judged at S103 whether or not a two-dimensional inclination obtained by combining the inclinations relative to the pitch axis and the roll axis deviates from the two-dimensional predetermined angle range for the flying robot 1. If the positive judgment is made at S103, the flow proceeds to S104. If a negative judgment is made, the flow proceeds to S107.

Next, at S104, it is judged whether or not the inclination detected at S102 is equal to or smaller than a fall angle. If the flow of the process proceeds to S104, it means that the inclination is in the state in which it is difficult for the flying robot 1 to stably continue the walking work. The fall angle is a threshold for such an angle that, if the inclination of the flying robot 1 becomes larger than the fall angle, the inclination is in a state in which a fall of the flying robot 1 cannot be avoided. Therefore, if the positive judgment is made at S103, it means that the inclination of the flying robot 1 is in the state in which it is difficult to stably perform the walking work though the flying robot 1 does not fall. On the other hand, if the negative judgment is made, it means that the inclination is in a state in which the flying robot 1 may fall. Note that the fall angle may be set for each of the pitch axis and the roll axis. If a positive judgment is made at S104, the flow proceeds to S105. If a negative judgment is made, the flow proceeds to S108.

If the positive judgment is made at S104, processes from S105 to S107 are sequentially performed. First, at S105, auxiliary propulsion of each of the six propulsion units 23 provided on the upper-side body unit 2 for returning the inclination of the flying robot 1 into the above predetermined angle range is calculated. For example, if the flying robot 1 is inclined to the back side as illustrated in FIG. 3, three propulsion units 23 arranged almost on the back side among the six propulsion units 23 are driven to cause auxiliary propulsion to occur. As a result, auxiliary propulsion does not occur on the front side of the flying robot 1, but the auxiliary propulsion occurs on the back side. Therefore, the posture of the flying robot 1 inclines to the front side, and, thereby, it is possible to return the inclination into the predetermined angle range. Therefore, at S105, the auxiliary propulsion of each propulsion unit 23 enabling such correction of the inclination of the flying robot 1 is calculated. Note that this auxiliary propulsion is not propulsion large enough to cause the flying robot 1 to fly.

Then, at S106, based on the auxiliary propulsion of each propulsion unit 23 calculated at S105, driving of the propulsion unit 23 is performed. For this driving, the posture control unit 211 supplies power corresponding to required auxiliary propulsion from the battery 26 to the actuator 22 of each propulsion unit 23. Then, at S107, it is judged whether or not the predetermined work executed at S101, that is, the walking work of the flying robot 1 has ended. As for this end judgment, a configuration is made in which, when the walking work is ended by the walking control unit 310 of the lower-side body unit 3, an end notification about that is sent from the lower-side body unit 3 to the upper-side body unit 2. If the control device 200 has received the end notification, it is judged that the walking work has ended. If a positive judgment is made at S107, the present posture control is ended. If a negative judgment is made, the processes at and after S102 are performed again.

If a negative judgment is made at S104, processes of S108 and S109 are sequentially performed. First, at S108, considering that the inclination exceeds the fall angle and is in the state in which the flying robot 1 can fall down, the walking work, which is predetermined work, performed by the flying robot 1 is stopped. Then, at the next S109, flight control is executed by the flight control unit 210. In a flight state, basically, all the six propulsion units 23 are driven, and propulsion sufficient to cause the flying robot 1 to fly is caused to occur. Thereby, the flying robot 1 is in the flight state. Thereby, the flying robot 1 can avoid a fall and, after that, restore its own posture. After restoring the posture, the flying robot 1 may return to the stop position to restart the walking work stopped at S108 and start the walking work. Alternatively, the flying robot 1 may execute the initial walking work again from the beginning.

In the case of the present embodiment, according to the above posture control, if the inclination of the flying robot 1 becomes large and deviates from the predetermined angle range while the flying robot 1 is performing walking work, it is possible to keep the inclination within the predetermined angle range by causing auxiliary propulsion to occur by driving the propulsion units 23 by the posture control unit 211. As a result, the flying robot 1 can stably continue the walking work. Further, when the inclination of the flying robot 1 exceeds the fall angle due to some reason even if such inclination adjustment by the posture control unit 211 is performed, priority is given to avoidance of a fall of the flying robot 1, and the walking work is discontinued, by performing flight control by the flight control unit 210. As a result, it is possible to avoid a careless fall of the flying robot 1 and, thereby, realize prevention of damage of the flying robot 1 and speedy completion of the walking work.

<Modification 1 of Flying Robot 1>

Here, a first modification of the flying robot 1 will be described based on FIG. 5A. The flying robot 1 illustrated in FIG. 5A and the flying robot 1 illustrated in FIG. 1 are mainly different in a configuration of the lower-side body unit 3. Description of the upper-side body unit 2 common to both flying robots 1 is omitted.

Here, as for the flying robot 1 illustrated in FIG. 5A, the two leg units 30 are attached to the lower-side body 35. Furthermore, as for the flying robot 1, one arm unit 40 configured to be capable of executing predetermined work is attached to the lower-side body 35. In other words, as for the flying robot 1, grasping work of grasping a target object by the arm unit 40 is also assumed as predetermined work in addition to the above-described walking work by the leg units 30. The arm unit 40 has an end effector 41 for grasping a target object, a wrist unit 42 that is relatively rotatably connected with the end effector 41 via a joint, a first link unit 43 that is relatively rotatably connected with the wrist unit 42 via a joint, a second link unit 44 that is relatively rotatably connected with the first link unit 43 via a joint, and a plurality of actuators (not illustrated) that drive-control rotation of the joints. A rotation direction of each of these joints is designed according to the target object grasping work. As an example, the joint between the end effector 41 and the wrist unit 42 is configured to be capable of rotating around the yaw axis; a joint between the wrist unit 42 and the first link unit 43 is configured to be capable of rotating around the roll axis; and the joint between the first link unit 43 and the second link unit 44 is configured to be capable of rotating around the pitch axis. Note that the configuration of each joint is not limited to such an aspect.

The second link unit 44 is relatively rotatably connected with a lower-side body 35 that the lower-side body unit 3 has, via a predetermined joint. This predetermined joint is configured to be capable of rotating around the yaw axis and the pitch axis. The predetermined joint may also be configured to be capable of rotating around the roll axis. As for the arm unit 40 connected with the lower-side body 35, grasping control as predetermined work is realized by actuators for driving the joints, which are provided inside the arm unit 40, being controlled. Since control about grasping a target object is publicly known technique, detailed description thereof will be omitted in the present specification. Note that the grasping work by the arm unit 40 is executed by a functional unit that executes the grasping work and that the control device 300 has (that is, a functional unit corresponding to the walking control unit 310 described above).

The flying robot 1 configured as described above can execute both of walking work by the leg units 30 and grasping work by the arm unit 40 as described above. Both of the walking work and the grasping work may be simultaneously performed or alternately performed. Further, the flying robot 1 is capable of performing the grasping work by the arm unit 40 while flying by propulsion of the propulsion units 23 of the upper-side body unit 2 (that is, in a state in which the leg units 30 have not grounded). Alternatively, even in a place where footing is bad, and the body unit of the flying robot 1 is difficult to support only by the leg units 30, the flying robot 1 can be arranged in the place while a load on the propulsion units 23 is being suppressed by driving the propulsion units 23 in a state in which the leg units 30 have grounded, and, for example, the flying robot 1 can perform predetermined grasping work by the arm unit 40 there.

Here, a case is assumed where the flying robot 1 is performing grasping work by the arm unit 40 in the state in which the leg units 30 have grounded. At this time, walking work may be performed or may not be performed by the leg units 30. In this case, when the grasping work of a target object is performed by the arm unit 40, the flying robot 1 can resist reaction force received from the target object and other external forces, via the leg units 30 that have grounded. In other words, the arm unit 40 corresponds to a work manipulator of the invention of the present application, and the leg units 30 correspond to the contact support unit of the invention of the present application. However, there is a possibility that, when the flying robot 1 is performing the grasping work, the inclination of the flying robot 1 increases due to some reason, and it becomes difficult to continue the grasping work. Therefore, by also applying the posture control illustrated in FIG. 4 to the flying robot 1, it is possible to keep the inclination in the predetermined angle range and avoid a fall by flight control. Note that the case where the flying robot 1 performs the above walking work described above as predetermined work is as described above.

<Modification 2 of Flying Robot 1>

Next, a second modification of the flying robot 1 will be described based on FIG. 5B. The flying robot 1 illustrated in FIG. 5B and the flying robot 1 illustrated in FIG. 5A are mainly different in the configuration of the lower-side body unit 3. Specifically, as for the flying robot 1 illustrated in FIG. 5B, one leg unit 30 is attached to the lower-side body 35. Therefore, the flying robot 1 cannot execute the walking work described above as predetermined work. However, by causing the leg units 30 to ground, a part or all of the body unit of the flying robot 1 can be supported, and driving of the propulsion units 23 can be stopped when the grasping work by the arm unit 40 is performed, or propulsion by the propulsion units 23 can be suppressed. This is useful to secure power of the battery 26 for driving the propulsion units 23. Further, the posture control described above can be also applied to the flying robot 1 of the present modification, and, thereby, it is possible to keep the inclination of the flying robot 1 within the predetermined angle range and avoid a fall by flight control. In the present modification also, the arm unit 40 corresponds to the work manipulator of the invention of the present application, and the leg units 30 correspond to the contact support unit of the invention of the present application.

DESCRIPTION OF THE REFERENCE NUMERALS

1 Flying robot
2 Upper-side body unit
3 Working body unit
21 Propeller
22 Actuator
23 Propulsion unit
25 Upper-side body
30 Leg unit
35 Lower-side body
40 Arm unit

The invention claimed is:

1. A flying robot executing walking work, the flying robot comprising:
    a body unit; and
    a propulsion portion comprising a plurality of propulsion units configured to cause propulsion to occur by driving rotor blades, the plurality of propulsion units being provided on an upper side of the body unit via bridges;
    the flying robot further comprising:
    a plurality of leg units, provided on the lower side of the body unit, configured to contact a predetermined contact surface to be capable of supporting at least a part of the body unit for the walking work;
    a sensor configured to detect an inclination of the body unit; and
    a control unit configured to perform control related to flight of the flying robot using the propulsion portion based on environmental information corresponding to a yaw axis, a pitch axis, and a roll axis of the body unit, the control unit configured to, when the plurality of leg units contacts the predetermined contact surface, and the walking work is being performed, execute posture control to drive at least one of the plurality of propulsion units based on the inclination of the body unit detected by the sensor so that the inclination of the body unit is kept within a predetermined angle range.

2. The flying robot according to claim 1, wherein
    the control unit executes the posture control if, when walking is being performed by the plurality of leg units, the inclination of the body unit is beyond the predetermined angle range and equal to or less than a fall angle at which the flying robot performing the walking can fall; and
    the control unit stops the walking and flies by the propulsion portion if, when walking is being performed by the plurality of leg units, the inclination of the body unit exceeds the fall angle.

3. A flying robot executing predetermined work, the flying robot comprising:
    a body unit; and
    a propulsion portion comprising a plurality of propulsion units configured to cause propulsion to occur by driving rotor blades, the plurality of propulsion units being provided on the body unit;
    the flying robot further comprising:
    a contact support unit configured to contact a predetermined contact surface to be capable of supporting at least a part of the body unit;
    a sensor configured to detect an inclination of the body unit; and
    a control unit configured to, when the contact support unit contacts the predetermined contact surface, and the predetermined work is being performed, execute posture control to drive at least one of the plurality of propulsion units based on the inclination of the body unit detected by the sensor so that the inclination of the body unit is kept within a predetermined angle range;
    wherein the predetermined work is walking work of the flying robot on the predetermined contact surface;
    the contact support unit is a plurality of leg units configured to support the body unit for the walking work;
    the control unit executes the posture control if, when walking is being performed by the plurality of leg units, the inclination of the body unit is beyond the predetermined angle range and equal to or less than a fall angle at which the flying robot performing the walking can fall; and
    the control unit stops the walking and flies by the propulsion portion if, when walking is being performed by the plurality of leg units, the inclination of the body unit exceeds the fall angle.

\* \* \* \* \*